Dec. 1, 1931. H. J. SAUER 1,834,647
LIGHT REFLECTING DEVICE
Filed May 14, 1930
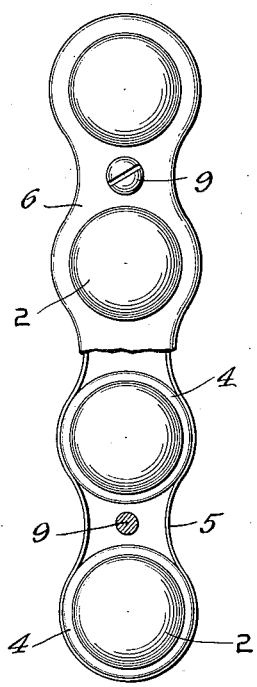
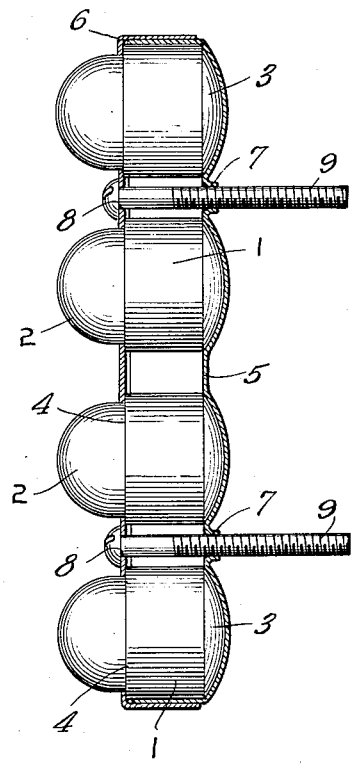
Henry J. Sauer.
INVENTOR
Mitchell & Bechert
ATTORNEYS.

Patented Dec. 1, 1931

1,834,647

UNITED STATES PATENT OFFICE

HENRY J. SAUER, OF FAIRFIELD, CONNECTICUT, ASSIGNOR TO THE KILBORN-SAUER COMPANY, OF FAIRFIELD, CONNECTICUT, A CORPORATION OF CONNECTICUT

LIGHT-REFLECTING DEVICE

Application filed May 14, 1930. Serial No. 452,178.

My invention relates to a light-reflecting device or reflector.

As is well known, many forms of signals are given by means of auto-collimating reflectors having sufficient divergency so as to make the signal appear luminous to those in the neighborhood of the source of light. These light-reflecting devices may be used for many purposes including railroad signals, number or name-plates for streets, houses, and automobiles, advertising signs, and danger signals generally. They are especially useful for fulfilling the function of tail lights on automobiles, carriages, motorcycles and bicycles.

It is one of the main objects of the present invention to provide improvements in light-reflecting devices to facilitate the fitting and/or grouping of the optical elements comprising the same in frames or holders, and to protect the optical elements against damage.

Other objects and features of the invention will be pointed out or will become apparent upon a reading of the specification.

Briefly stated, I employ one or more optical elements of special shape and a special form of frame or holder for the same. The optical units or elements are preferably catadioptric.

In the drawings which show, for illustrative purposes only, a preferred form of the invention—

Fig. 1 is a front end elevation of a reflector with part of the cover broken away;

Fig. 2 is a central longitudinal section of the reflector showing the optical elements in elevation.

In said illustrative drawings, 1 indicates generally an optical unit or element. This consists of a glass body, the intermediate portion of which is preferably substantially cylindrical. The front end 2 of the glass body is convexly spherical, and serves as the objective of the optical element. The entire rear end 3 of the glass body is also convexly spherical. The front and rear ends 2 and 3 have a common normal and a common center of curvature. The rear end 3 has a greater radial extension than the front end 2 from the common normal to the front and rear ends. In a preferred form of the invention I silver or foil the rear end 3 to form a reflecting surface, thus producing a catadioptric element. The portion of the glass body in rear of the front end 2 extends outwardly so as to form an abrupt annular marginal shoulder 4. This shoulder forms a support in a plane at right angles to the common normal to the front and rear ends 2 and 3. The shoulder 4 has a greater radial extension from the common normal than that part of the glass body which is in front of the shoulder 4. The shoulder 4 is positioned sufficiently in front of the reflecting surface at the rear end 3 so that rays of light passing through the common center of curvature of the front and rear ends 2 and 3 are reflected from the extreme edge of the reflecting surface without being interrupted by the shoulder 4.

Auto-collimation is secured by making the radius of curvature of the front end 2 equal to the radius of curvature of the rear end 3 multiplied by a number which is one less than the index of refraction of the glass.

The necessary divergence is secured by leaving unrectified the optical aberration, especially the spherical aberration, of the element.

By making the rear end 3 with a greater radial extension from the common normal than the front end 2, I increase the useful angular range or effective aperture of the unit.

The holder or frame for the optical units consists of a back member 5 and a cover member 6, which preferably telescope one within the other as shown in the drawings.

The cover member 6 has one or more holes through which the front ends 2 of the optical elements project. The opposite side walls of the inner telescopic member 5 are fluted or undulated so as to form a series of pockets or recesses to partially embrace the optical elements on opposite sides.

The shoulder 4 of each optical element bears against the inside surface of the cover member 6. Suitable means are provided for clamping the back and cover members 5 and 6 together so that the optical units will be firmly held between the same. In the form shown in the drawings, the back member 5 has threaded holes 7—7, and the cover member 6 has holes 8—8. Screws 9—9 are provided for passage through the holes 7—7, 8—8. When the screws 9—9 are tightened, the optical elements 1—1 will be clamped between the back and cover members 5—6.

If desired, I may form spherical recesses in the back member 5 conforming to the curvature of the rear ends of the optical units. Such recesses increase the area of the clamping surfaces of the optical units and cause them to be held more rigidly in the frame or holder. The inner surfaces of the spherical recesses may be polished for the purpose of securing reflection and auto-collimation instead of silvering or foiling the rear ends 3 of the optical elements.

While the invention has been described in considerable detail and one specific form shown in the drawings, it is to be understood that the invention may be otherwise embodied and employed in connection with light-reflecting devices and the like of various types other than that herein shown.

I claim:

1. A light-reflecting device comprising a plurality of catadioptric optical elements, and a holder for said elements comprising back and cover members fluted at opposite sides to form pockets for said optical elements, said cover member having passages to permit the front ends of said optical elements to project therethrough.

2. A light-reflecting device comprising a plurality of catadioptric optical elements, and a holder for said elements comprising telescopic back and cover members, the side walls of the inner of said telescopic members being undulated to form recesses to partially embrace said optical elements on opposite sides thereof, said cover member having holes therein, the front ends of said optical elements projecting through said holes.

3. A light-reflecting device comprising a plurality of catadioptric and substantially autocollimating optical elements, a holder for said elements comprising telescopic back and cover members, the side walls of the inner of said telescopic members embracing said optical elements at opposite sides thereof, said cover member having holes therein through which the front ends of said optical elements project, each of said optical elements having a shoulder thereon bearing against the inner surface of said cover member, and means for clamping said optical elements between said back and cover members.

4. A light-reflecting device comprising a plurality of optical elements, each of said elements comprising an integral glass body, the front end of said body being convexly spherical, the entire rear end of said body being convexly spherical and being provided with a reflecting surface, the front and rear ends of said body having a common normal and a common center of curvature, the radius of curvature of said front end being substantially equal to the radius of curvature of said rear end multiplied by a number which is one less than the index of refraction of the glass, the rear end of said body having a greater radial extension than the front end from the common normal to said front and rear ends, the portion of said glass body in rear of the front end thereof extending outwardly so as to form an abrupt annular marginal shoulder, said shoulder forming a support in a plane at right angles to the common normal of said front end rear ends, said shoulder having a greater radial extension from the common normal to said front and rear ends than that part of said glass body which is in front of said shoulder, said shoulder being positioned sufficiently in front of said reflecting surface so that rays of light passing through the common center of curvature of said front and rear ends will be reflected from the extreme edge of said reflecting surface without being interrupted by said shoulder, and a holder for said elements comprising back and cover members, said cover member having holes therein through which the front ends of said elements project, the shoulders on said elements bearing against said cover member.

HENRY J. SAUER.